United States Patent
Offer

[19]

[11] Patent Number: 5,994,659

[45] Date of Patent: Nov. 30, 1999

[54] METHOD AND APPARATUS FOR WELDING WITH PREHEATED FILLER MATERIAL

[75] Inventor: Henry Peter Offer, Los Gatos, Calif.

[73] Assignee: General Electric Company, San Jose, Calif.

[21] Appl. No.: 08/896,120

[22] Filed: Jul. 17, 1997

Related U.S. Application Data

[63] Continuation-in-part of application No. 08/671,787, Jun. 20, 1996, Pat. No. 5,714,735.

[51] Int. Cl.⁶ .................................................... B23K 9/167
[52] U.S. Cl. .............................................. 219/75; 219/136
[58] Field of Search ........................... 219/136, 74, 75, 219/137.8, 125.1

[56] References Cited

U.S. PATENT DOCUMENTS

| | | | |
|---|---|---|---|
| 2,778,099 | 1/1957 | Anderson et al. | 219/137.8 |
| 4,879,446 | 11/1989 | Morgan et al. | 219/136 |
| 4,924,053 | 5/1990 | Morgan et al. | 219/136 |

FOREIGN PATENT DOCUMENTS

| | | | |
|---|---|---|---|
| 62-263868 | 11/1987 | Japan | 219/75 |
| 1-299767 | 12/1989 | Japan | 219/75 |
| 5-77050 | 3/1993 | Japan | 219/75 |
| 1166942 | 7/1985 | U.S.S.R. | 219/74 |
| 1614903 | 12/1990 | U.S.S.R. | 219/75 |

*Primary Examiner*—Clifford C. Shaw
*Attorney, Agent, or Firm*—James E. McGinness; Dennis M. Flaherty

[57] ABSTRACT

An integrated non-consumable electrode and filler material nozzle for use with electric arc welding (or arc brazing). The electrode and filler nozzle are preferably integrated in one or more of the following ways: mechanically, thermally or electrically. The filler nozzle may be used to feed either hot or cold wire. Electric arc power and the wire resistance-heating power may be supplied by a single arc welding power supply, which is either directly or indirectly shunted between the electrode and filler nozzle. The nozzle can be designed to feed either single or multiple filler wires. The hot-wire nozzle preferably has a movable contact element which allows the electrical extension to be adjusted. Also the curvature of the outlet end of the hot-wire nozzle can be adjusted. If the nozzle is vertical, a wire deflection device at the nozzle outlet can be used to deflect the tip of the filler wire toward the weld puddle.

29 Claims, 6 Drawing Sheets

METHOD AND APPARATUS FOR WELDING WITH PREHEATED FILLER MATERIAL

RELATED PATENT APPLICATION

This application is a continuation-in-part application of U.S. patent application Ser. No. 08/671,787 filed on Jun. 20, 1996, now U.S. Pat. No. 5,714,735.

FIELD OF THE INVENTION

This invention relates to the automated welding of metal components. In particular, the invention relates to automated welding in a groove of small width using a flat welding electrode.

BACKGROUND OF THE INVENTION

A method known in the industry as "hot-wire" filler material addition is utilized in various welding processes to increase the filler deposition rate over that which can be achieved with cold-wire addition. This "hot-wire" effect is achieved by applying additional power to preheat the filler (usually in the form of a continuously fed wire). The resulting benefits are to melt filler of a predetermined composition and size with a given arc current at a faster rate, or to melt filler of a larger size at a similar rate, or to increase both the feed rate and the filler size simultaneously for a maximum increase in the filler deposition rate.

"Hot-wire" filler addition is practiced in the known welding art with either alternating or direct current from an additional, electrically isolated power supply. This current is applied to the filler material by means of an electrical contact nozzle through which the filler is fed. In this design, the nozzle is not electrically connected in a parallel circuit to the power supply for the arc, and therefore the voltage of the nozzle is independent of the arc voltage. In a known configuration, the filler material is heated between the end of the conductive nozzle and the "grounded" workpiece.

In another design that is uncommon in the welding industry, the nozzle is electrically connected in a parallel circuit to the power supply for the arc, and therefore the voltage of the nozzle is dependent on the arc voltage. This variation is known as "shunted-arc" hot-wire addition. It is known to exist only with the geometry where the non-consumable electrode and the filler nozzle are both approximately perpendicular to the work surface, i.e., with "vertical" wire feed. This geometry is intended for robotic joining applications to avoid the problem where, if the nozzle were inclined to the workpiece, then an additional rotation of the torch assembly would be required to maintain the nozzle in the same orientation with respect to the travel direction for nonlinear joint path shapes.

The resistive heating in the filler occurs as the electrical power is dissipated in the length extending between the end of the contact tube and the point where it enters the molten pool. This predetermined length of filler extension is essentially an electrical resistor with a continuously replenished resistive element. The degree of heating is independently determined by the feed rate, the length of filler from the contact tube to the workpiece, and the applied voltage for a predetermined filler size and material type. The voltage drop across this heated length is dependent upon the these independently set parameters. The current through this heated length is typically a dependent parameter, controlled according to Ohm's Law.

One problem with hot-wire addition is that the degree of wire heating cannot be well controlled due to the fixed (predetermined) length of filler which is resistance heated with existing nozzle designs.

A second problem is that the actual aim position, relative to the electrode tip, of a highly preheated filler becomes variable in part depending on the degree to which it is preheated and correspondingly made "limp".

A third problem is the excessively wide groove required for joining relatively thick material, necessitated by the need for the nozzle to have sufficient cross-sectional area to conduct the desired electrical current.

A fourth problem is the energy loss in the electrode, which increases the cooling requirements of the electrode holder without adding any additional capability to thermally preheat the filler material.

A fifth problem for the single power supply (shunted-arc) hot-wire configuration is the need to easily convert to cold-wire feed and back to hot-wire feed without a high-current switch at the torch or a high-current cable leading from a remote switch to the torch.

SUMMARY OF THE INVENTION

The present invention is an integrated non-consumable electrode and filler material nozzle for use with electric arc welding (or arc brazing). The invention is especially useful in high-efficiency joining applications with very high aspect-ratio groove designs, although it can be beneficially applied to cladding, build-up, repair and other joining geometries for welding as well. The apparatus of the invention has three major designs, and for each integrated design there are two basic variations for providing different assembly orientations relative to the work surface.

A first design, in which the electrode and filler nozzle are mechanically, thermally, and electrically integrated, is suited for electrical resistance preheated filler material addition, known as "hot-wire" welding. A second design, in which the electrode and filler nozzle are mechanically and thermally integrated but electrically insulated from each other, is suited for either hot-wire or cold-wire welding. A third design, also suited for either hot-wire or cold-wire welding, has an electrode and a filler nozzle which are only mechanically integrated. In accordance with the first design, both the electric arc power and the wire resistance-heating power may be supplied by only a single arc welding power supply, which is either directly or indirectly shunted between the electrode and filler nozzle. In the second and third designs for applications where the filler is hot wire, the arc and the wire power may be supplied by multiple power supplies; and for applications where the filler is cold wire, the arc power is supplied by a single supply.

For any of the three major integrated designs, the nozzle can be designed to feed either single or multiple fillers. If multiple fillers are used, they are oriented in an essentially parallel, adjacent configuration to feed into the same side of the molten pool. A slight angle between the fillers may be used to cause the fillers to converge to a predetermined spacing or to a single location relative to features of the heating process, such as the higher temperature axis of an electrical arc.

Multiple fillers are used to increase the deposition rate while using the preferred finer wire size and lower feed speed (as compared to feeding a larger wire, or a finer wire at a faster speed). Multiple fillers also increase the melting thermal efficiency by increasing the surface area of the filler, hence increasing the projected area exposed to the heat source, leading to greater heat transfer. Combinations of cold-wire and hot-wire feed may be used to achieve improvements such as the ability to melt higher-melting-temperature fillers with the hot-wire method, while simultaneously melting lower-melting-temperature fillers with the cold-wire method. Both improvements may be accomplished without overheating the lower-melting-temperature filler or underheating the higher-melting-temperature filler as can occur with the use of only a single filler-feeding method.

The orientations of the integrated electrode and nozzle assembly designs with respect to the work surface (and the path of the weld, for curved joints) are unique in these variations. The first orientation is with the integrated apparatus having a shallow slope (low entry angle relative to the work surface) approximately equal to or less than 45 degrees (1/1 slope), including the axis of the electrode. In contrast, the prior art utilizes filler nozzle slopes ranging from significantly less than 45 degrees to 90 degrees; however, the electrode angle is maintained near 90 degrees and is independent of the filler nozzle angle (in order to cause the arc to be emitted from the electrode tip at a perpendicular orientation to the work surface). In the case of a curved work surface, such as a circumferential weld around a pipe, this orientation is referenced to a line which is tangent to the local work surface. In the designs having a low-angle (horizontally inclined) electrode and nozzle assembly, the tip of the electrode is cut at an acute angle (rotated in the plane of the joint) with respect to the shank of the electrode so that the tip axis is still maintained approximately perpendicular to the work surface, while allowing the nozzle exit end to be maintained at the desired acute angle relative to the work surface. This first orientation will be referred to hereinafter as a low entry angle type.

This low-angle electrode orientation is suited for thin joints having no or a low degree of curvature (in a direction perpendicular to the torch travel direction) when a straight (linear axis) electrode and nozzle are used. However, significant joint curvature can also be accommodated if the electrode and nozzle are similarly curved to have a shape approximating the radius of the joint path (in addition to optional curvature).

The second orientation in accordance with the present invention is with the integrated nozzle shank and electrode shank maintained approximately perpendicular to the work surface, with the exit end of the nozzle curved toward the electrode tip. This orientation provides the preferred low wire entry angle into the molten pool while maintaining a close proximity of the electrode and nozzle shanks, with the preferred common mounting arrangement. This second orientation will be referred to hereinafter as a high entry angle type. This high-angle orientation is versatile and suited for thin joints having either no curvature, or even a significantly high degree of curvature (perpendicular to the torch travel direction).

For either the low or high entry angle configuration, the close proximity of the electrode and nozzle shanks allows them to be readily integrated mechanically, thermally and electrically (thermal and electrical integration each being optional) without the use of a laterally mounted filler nozzle bracket which is separate from the electrode mount (commonly called a torch block). The mechanical integration improves the stability of the critical relative position between the electrode tip and the nozzle exit end. Thermal integration improves the cooling of the electrode while correspondingly improving the preheating of the hot-wire or cold-wire filler. Electrical integration simplifies the circuit design and, when combined with mechanical integration, reduces the electrical resistance of the nozzle when used in a single power supply hot-wire system.

Integration of the electrode with the nozzle in accordance with present invention provides significant benefits, depending on the combination of nozzle design and orientation utilized. These benefits include:

1. Improved stability of the critical spacing between the electrode tip and the filler as it enters the molten pool.

2. Increased stiffness of the thin electrode and/or thin nozzle as required for very reduced-width, high-aspect-ratio joints.

3. Greater utilization of the waste heat in and improved cooling of the electrode as the filler within the nozzle is conductively heated, especially for cold-wire passes.

4. Means of preheating the filler by thermal conduction as it passes through a resistively heated nozzle or by a heating element attached to the nozzle (or both).

5. Simplification of the electrode and nozzle mounting devices, which can be mechanically combined as a single part or mounted by a single device if not combined.

6. Simplification of the electrode and nozzle electrical connections in the shunted arc, single power supply type of hot-wire circuit.

7. Maintenance of the preferred low entry angle of filler wire as it enters the pool, even for joints with significant curvature perpendicular to the depth of the joint (and needing vertical wire feed).

8. Ability to easily change between hot-wire and cold-wire feed, for the single power supply (shunted-arc) hot-wire configuration, without a high-current switch at the torch or a high-current cable leading from a remote switch to the torch.

9. Increase of the maximum practical (defect-free) filler wire deposition rate for a predetermined heat input, achieved by an increase in the filler size or feed rate.

DETAILED DESCRIPTION OF THE PREFERRED EMBODIMENTS

The present invention can be used as part of a gas tungsten arc welding (GTAW) system adapted for welding a reduced-width groove to form a welded joint between two parts. The GTAW system has mechanized torch movement and a tungsten electrode with a geometry designed to fit in the reduced-width groove. The sidewalls of the groove preferably have an acute angle less than 5°. The blade of the electrode has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads are deposited inside the groove using the thin elongated tungsten alloy electrode to melt the filler wire fed into the groove by a filler material nozzle. The electrode fits inside the groove with clearance between the electrode and the sidewalls. The blade of the electrode is optionally covered with a ceramic coating to prevent arcing to the sidewalls of the groove. The welding electrode is powered by a conventional arc power supply to produce an arc.

Figure 1:
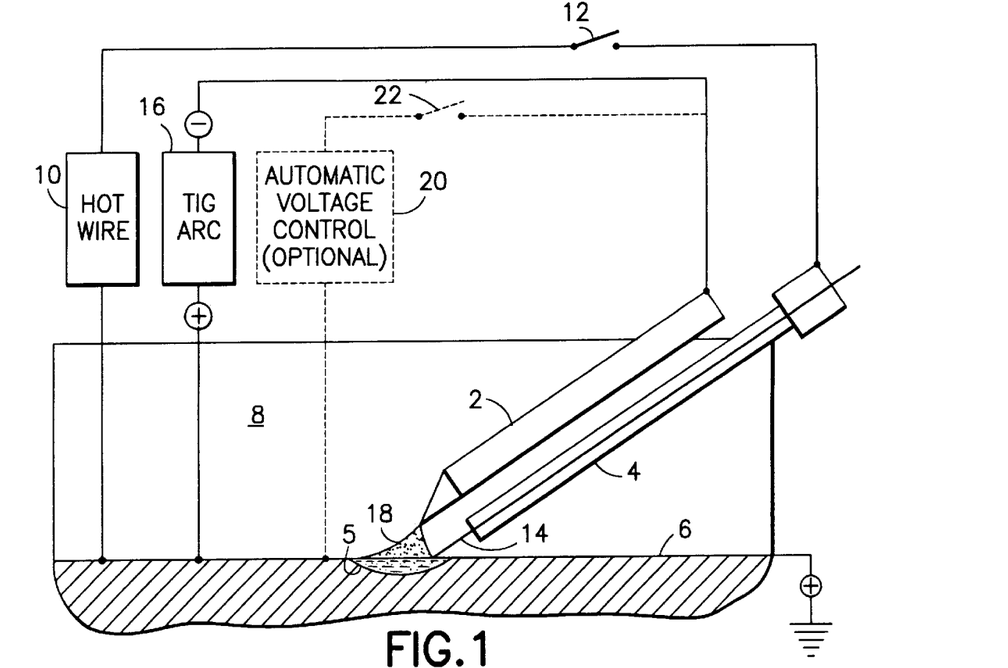
FIGS. 1 and 2 are schematics showing an inclined arrangement of the electrode and hot-wire nozzle in a sectioned open weld joint in accordance with first and second preferred embodiments of the invention respectively having dual and single power supplies.
Figure 2:
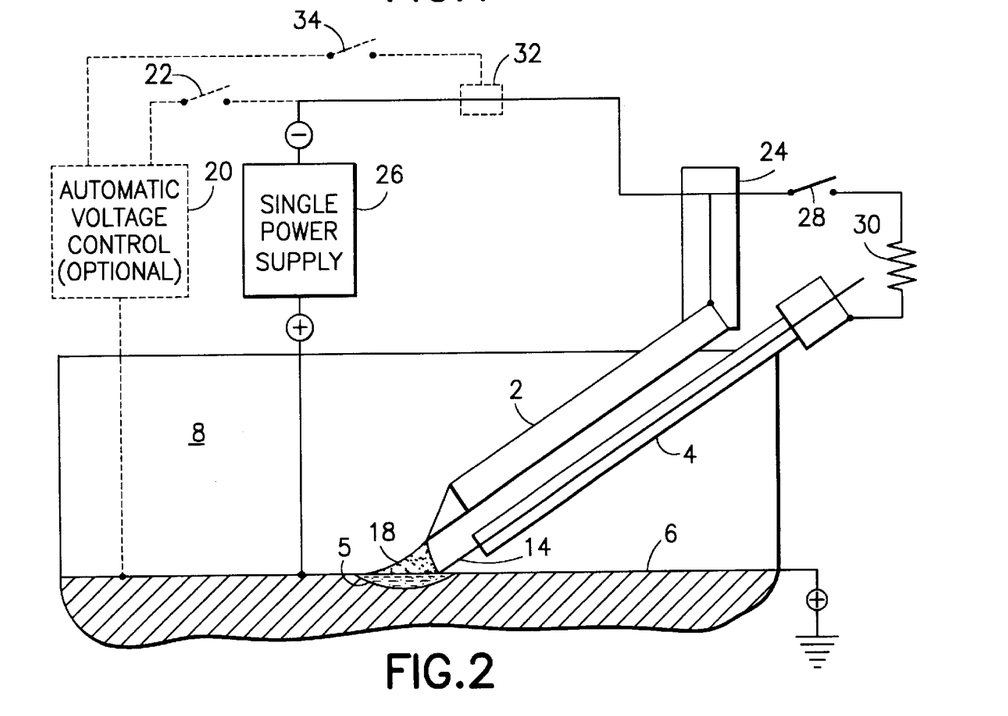
Figure 3A:
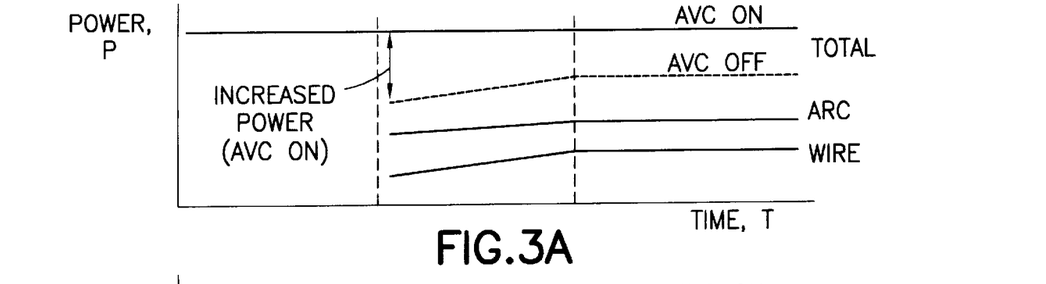
FIGS. 3A–3E are graphs showing power, voltage, current, resistance and arc length, respectively, over time as a function of automatic voltage control.
Figure 3B:
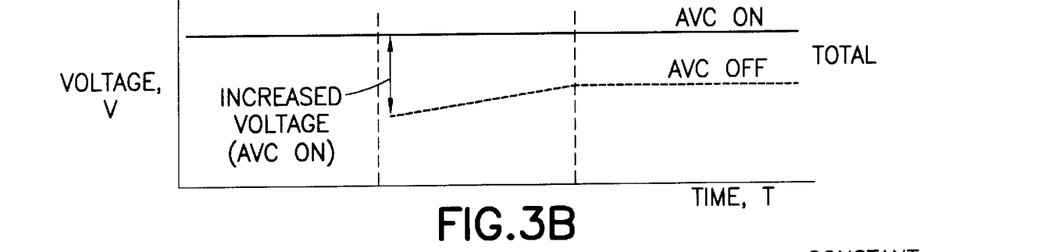
Figure 3C:
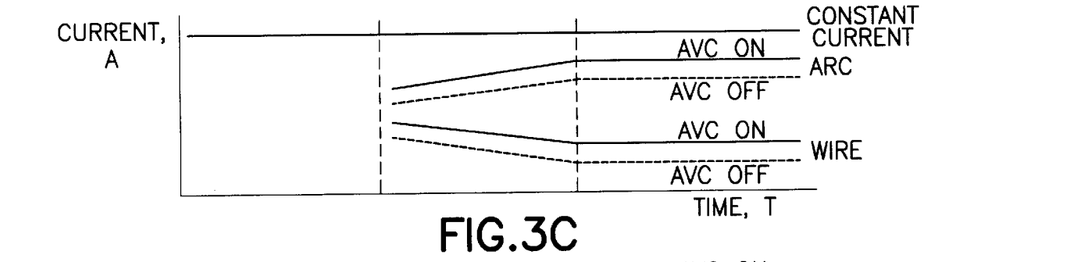
Figure 3D:
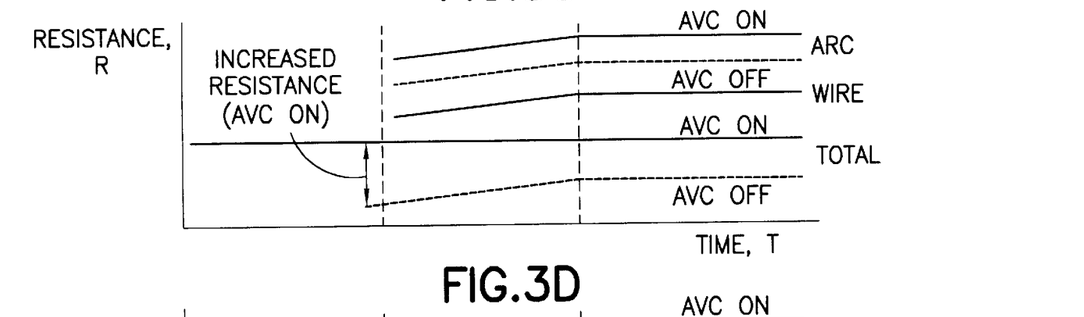
Figure 3E:
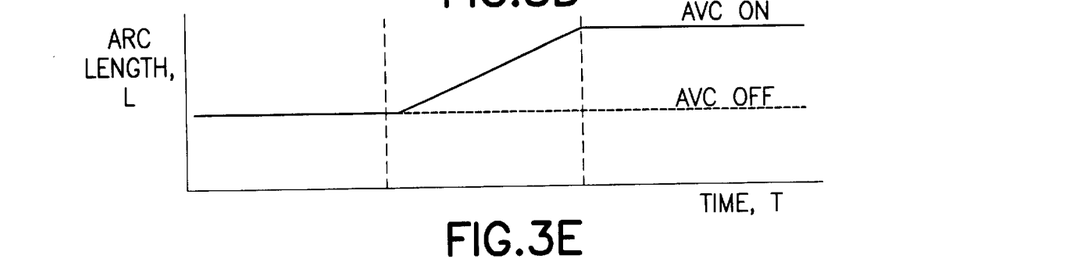

In accordance with first and second preferred embodiments of the invention, an electrode 2 and a filler nozzle 4 are arranged generally mutually parallel and inclined at a low entry angle (e.g., significantly less than 90°, preferably 45° or less) relative to the work surface 6, as seen in FIGS. 1 and 2. The electrode and filler nozzle are aligned in the plane of a groove extending above the work surface and formed by a first sidewall 8 and a second sidewall (not shown) opposing the first sidewall. The sidewalls are preferably mutually parallel or form a very small angle, e.g., a few degrees. The electrode and filler nozzle in the embodiment of FIG. 1 are not electrically integrated. In the event that electrode 2 and nozzle 4 are mechanically integrated, the electrode can be electrically insulated from the nozzle by means of a layer of dielectric material bonded to either the electrode shank or the nozzle outside surface. In contrast, the electrode and filler nozzle in the embodiment of FIG. 2 are electrically integrated. In the embodiments of FIGS. 1 and 2, the tip of the electrode is asymmetric relative to the axis of the electrode.

Figure 4:
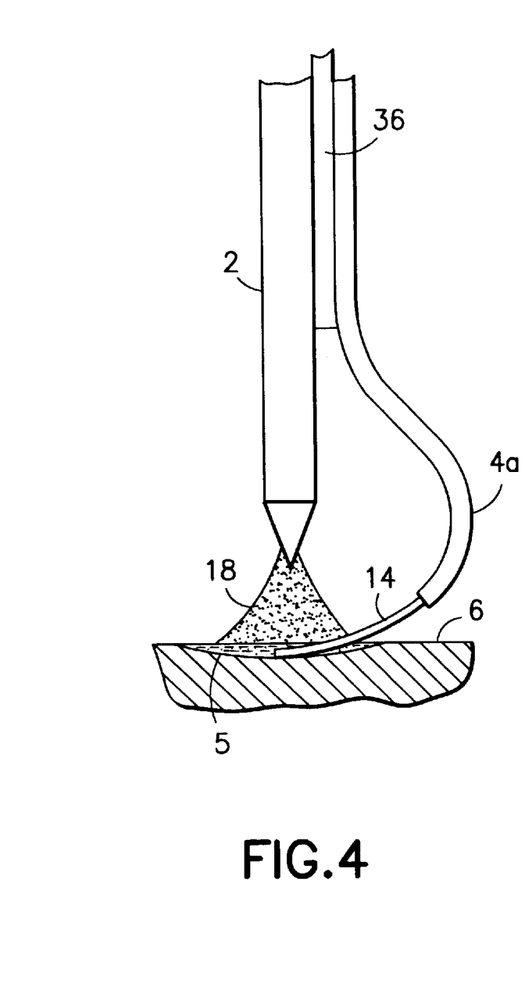
FIGS. 4 and 5 are schematics showing mechanically integrated electrode/filler wire nozzle assemblies in accordance with third and fourth preferred embodiments of the invention respectively having a vertical electrode with low-entry-angle nozzle (FIG. 4) and a low-entry-angle electrode/nozzle assembly.
Figure 5:
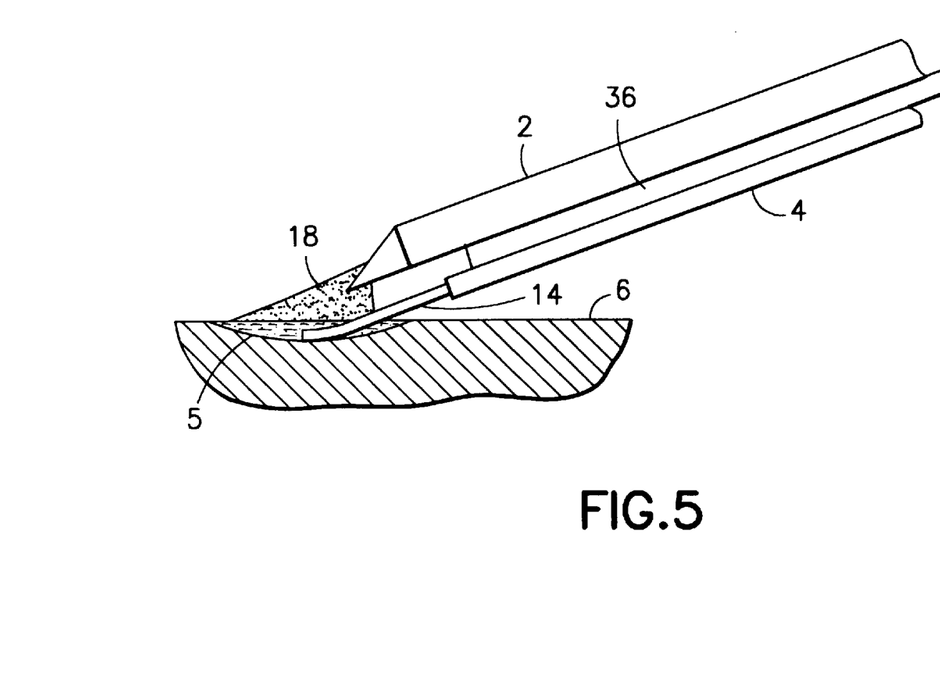

In addition, the low-entry-angle electrode and filler nozzle may be mechanically integrated, e.g., by means of a spacer 36, as seen in FIGS. 4 and 5. The spacer can be made of electrically insulating or conducting material depending on whether cold- or hot-wire filler addition is desired. Alternatively, in addition to or instead of conventional hot-wire resistance pre-heating of the filler wire between the nozzle end and the workpiece, the filler wire can be pre-heated by thermal conduction (via the nozzle) from a spacer made of resistive heating or semiconducting material connected to a power supply. Also, the nozzle can be made of resistive heating or semi-conducting material in order to pre-heat the filler wire.

In accordance with a further variation of the present invention, a second filler nozzle can be mechanically integrated to but electrically insulated from nozzle 4 in FIG. 5 or nozzle 4a in FIG. 4. In this variation, one filler nozzle can be operated in a hot-or cold-wire mode independent of the mode of the other filler nozzle.

In the case where the electrode and nozzle are straight and inclined at a low entry angle (i.e., FIG. 5), the length of the assembly must be maximized in order that the electrode tip and the exit end of the filler nozzle be proximal to the work surface 6. Alternatively, the electrode and nozzle can be curved in order to reduce the length of the portion of the assembly which resides in the welding groove. That length can be further reduced using the high-entry-angle electrode configuration shown in FIG. 4, in which the filler nozzle 4a has a first portion extending parallel to the generally vertical electrode 2, a second portion which curves away from the electrode in the plane of the weld groove, and a third portion which curves toward the electrode in the plane of the weld groove until the desired low wire entry angle is attained. Alternatively, the filler nozzle can be held further away from the electrode by a wider spacer, in which case the filler nozzle can have a first portion extending parallel to the generally vertical electrode and a second portion which curves toward the electrode in the plane of the weld groove until the desired low wire entry angle is attained.

In accordance with a further aspect of the invention, the electrode and filler nozzle can be thermally integrated. For example, the spacer 36 shown in FIGS. 4 and 5 can be made of thermally conductive material so that heat generated by electrode 2 is conducted to nozzle 4, which in turn conducts heat to the filler wire 14, whereby the filler wire is thermally preheated.

Referring again to FIG. 1, a hot wire power supply 10 is connected to the filler nozzle 4 via a switch 12. When switch 12 is open, the filler wire 14 is fed cold, i.e., without preheating, out of the filler nozzle 4. The filler nozzle is positioned such that the tip of the filler wire is immersed in the weld puddle 5 formed beneath the arc 18. When switch 12 is closed, electrical power from the hot wire power supply 10 is used to preheat the filler wire 14. For TIG welding, the electrode is powered by the TIG arc power supply 16, forming an arc 18 between the tip of the electrode 2 and the work puddle 5. The tip of the preheated filler wire 14 is melted by the arc and/or the superheated weld puddle, depending on the wire aim position. As the electrode and filler nozzle travel in unison along the groove, the trailing edge of the weld puddle cools and fuses to form a weld bead. This process continues until a weld pass is completed.

During each weld pass, the arc voltage is preferably maintained constant by variation of the arc length as the electrode travels in the groove. This is accomplished using a conventional automatic voltage control (AVC) servo system 20, which is electrically connected to the electrode 2 via a closed switch 22. When switch 22 is open, the electrode is operated without automatic voltage control.

In accordance with the preferred embodiment shown in FIG. 2, the electrode holder 24 (and therefore the arc 18 at the tip of the electrode 2) and the filler nozzle 4 (and therefore the portion of the filler wire 14 exiting the tip of the conductive nozzle) are electrically common, and are both at approximately the same voltage relative to the workpiece 6. When the filler wire 14 is in contact with the workpiece 6, arc 18 and wire 14 share the total current from a single constant-current power supply 26, according to Kirchoff's Law for electrical resistances connected in a parallel circuit.

Depending on the welding parameters selected to produce the desired condition of weld deposit, the total current level may be programmable to vary with other predetermined values such as the filler material feed status (off or on), the filler feed speed, the electrode travel position or with the weld sequence time. The arc and wire electrical parameter sequences for GTA welding with parallel circuit hot-wire addition using a single power supply are shown in FIGS. 3A through 3E.

In accordance with a variation of the second preferred embodiment, a switch 28 is installed in the connection between the electrode holder 24 and the filler nozzle 4 (see FIG. 2). When switch 28 is open, the system can be operated in the cold-wire feed mode, or in the hot-wire mode with two power supplies. The system can operate without filler feed with the switch either open or closed. The system can be readily reconfigured by closing switch 28 to be in the hot-wire mode, powered by one supply. Other variations of the second preferred embodiment use an adjustable current-controlling circuit to adjust the current distribution between the electrode and the filler, while maintaining a constant-current source.

Variations of the apparatus and method in accordance with the second preferred embodiment allow the use of either a mechanically and electrically integrated electrode and hot-wire filler nozzle, or of physically separate but electrically connected units utilizing a flat nozzle design. In either case, when a single power supply is used, it is electrically connected to and simultaneously provides the current for maintaining both the electric arc and the filler resistance heating.

In accordance with a further variation of the second preferred embodiment, the voltage supplied to heat the filler material can be reduced below that supplied to the arc by the use of an additional resistive element 30 (see FIG. 2) in the circuit to the filler nozzle assembly. Alternatively, the inverse configuration may be used to maintain the arc at a relatively lower voltage. Predetermined or changeable filler voltage adjustments may be made as required to suit different welding conditions if this added resistive element is replaced with ones of different values, or generally made variable. The resistive element can be made a part of the nozzle assembly, which would enable the heat generated by the resistance to be used to additionally heat the incoming wire by thermal conduction.

In accordance with another variation of the second preferred embodiment, a current sensing device 32 is connected to the branch of the circuit to the wire nozzle 4. Alternatively, the current sensor can be connected to the circuit branch to the electrode holder 24. For a programmable level of total current, the current in either branch can be advantageously controlled based on the value measured in one branch. The value in the first branch is equal to the total current minus the value in the second branch. The value of the total current may vary with the progression (weld time or arc position) of the joining process.

In accordance with another variation of the invention, the length of the filler wire extension from the end of the conductive part of the guide nozzle 4 may be independently varied relative to the length of the wire 14 extended beyond a terminal, non-conductive part of the nozzle. This control feature allows the electrical resistance and resultant heating of the wire to be adjusted with an improvement in both the filler positioning capability of the nozzle as well as the resistive heating capability for predetermined values of the filler parameters, such as size, material type and feed rate.

Optionally, the end of the filler nozzle may be curved to provide improved alignment of a curved wire with the electrode tip, especially for extended-length electrodes and nozzles, as needed for joints having very high aspect ratio (ratio of depth to width). In addition, the curved tip provides improved electrical contact between the nozzle tip and the filler wire.

In particular, in the preferred embodiments depicted in FIGS. 6A–6D, the length of unsupported filler wire extending from the distal end of the nozzle to the wire contact point at the workpiece can be held constant (hereinafter called the "mechanical extension"), while simultaneously allowing changes in the portion of the wire extending from the end of the electrical contact tube (hereinafter called the "electrical extension"). The distal end of the nozzle (which defines the mechanical extension) is electrically insulating, whereas the outlet end of the contact tube (which defines the electrical extension) is electrically conducting.

The purpose of maintaining the mechanical extension relatively short and constant is to retain the needed aim position of the wire into the weld pool, even for wire with a slight helical shape remaining from being unwound from spools of small diameter. The purpose of adjusting the electrical extension is to vary the heated length of the wire, and therefore the temperature to which it is heated before it enters the weld pool. This extended length determines the resistance of the wire, and therefore for a predetermined current level also determines the voltage decrease and power dissipated along its length.

The adjustment of the relationship between the mechanical and electrical extensions may be performed manually or mechanically either before or during the course of the jointing, and may be electromechanically integrated into the wire current sensing and control servo circuit as a means of adjusting the ratio between the arc and wire currents. In accordance with one aspect of the present invention, these extensions can be adjusted with either single or multiple filler wires fed simultaneously, in order to improve control of the deposition rate or deposit properties.

Figures 6A, 6B, 6C, 6D:
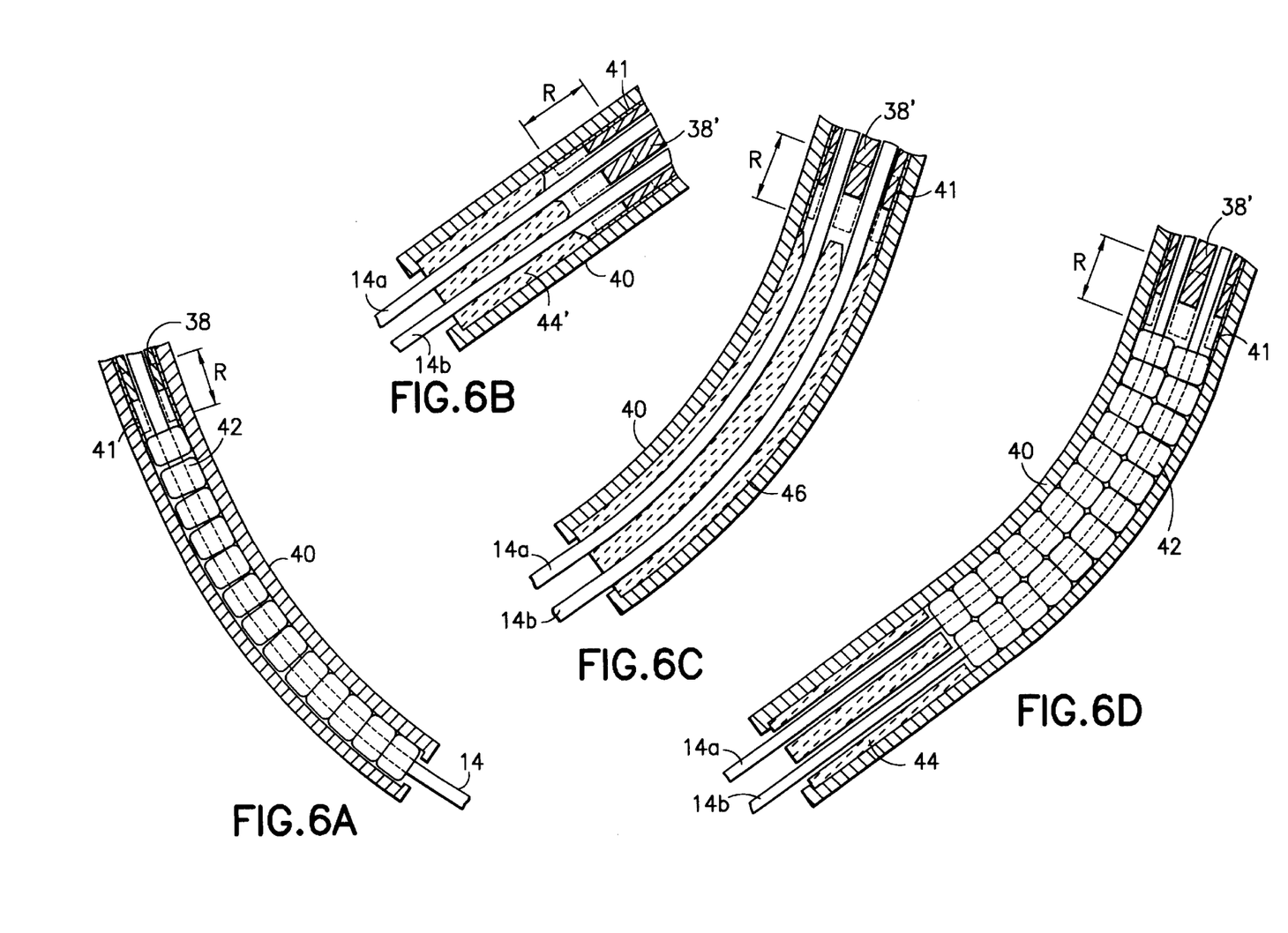
FIGS. 6A–6D are schematics showing sectional views of the outlet end of the hot-wire nozzle in accordance with four further preferred embodiments.

Referring to FIG. 6A, a preferred embodiment of a filler nozzle has an electrically conductive contact tube 38 which is slidable within an outer sheath 40 made of stainless steel. The contact tube is electrically connected to a power supply (not shown) and is electrically insulated from outer sheath 40 by means of an inner sheath 41 made of electrically insulating material. The axial position of the contact tube 38 relative to outer sheath 40 can be adjusted by suitable mechanical or electromechanical means. (R indicates the range of adjustment.) The filler wire 14 passes through the bore of contact tube 38 and is in electrical contact with the tube. The distal section of outer sheath 40 extends beyond the end of contact tube 38 and houses a multiplicity of spacer beads 42 made of electrically insulating material, e.g., ceramic. Each spacer bead 42 has a circular cylindrical shape and a central cylindrical hole through which the filler wire 14 passes. Spacer beads 42 are loosely arranged end to end with the central holes generally aligned along the centerline axis of the distal end of outer sheath 40 and with the filler wire threaded therethrough. The spacer beads maintain the filler wire generally coaxial with the centerline axis of the distal section of outer sheath 40. When the tip of the filler wire contacts the weld puddle, current flows from the contact tube 38 to the workpiece (not shown) via the filler wire 14. The portion of the filler wire extending out of the contact tube 38 has as an electrical resistance which transforms electrical energy into thermal energy, thereby preheating the filler wire before it is melted by the welding arc. The relatively movable spacer beads 42 allow the curvature of the outer sheath 40 to be adjusted.

In accordance with a further preferred embodiment shown in FIG. 6D, a multi-filler nozzle is constructed having a section with adjustable curvature. In this embodiment, the contact element 38' has two bores, each bore receiving a separate filler wire 14a and 14b. In this case, the outer sheath 40 has a non-circular, e.g., oval, cross section. The circular cylindrical ceramic spacer beads 42 are arranged in two rows, one filler wire passing through the central holes of one row and the other filler wire passing through the central holes of the other row of spacer beads. Alternatively, multi-hole beads can be used. Optionally, the distal end of the nozzle is straight, in which case a straight ceramic spacer element 44 having a noncircular cross section and parallel holes for the respective filler wires is housed between the nozzle outlet and the ceramic spacer beads.

Alternatively, a ceramic spacer element 44' having a pair of nonparallel holes can be inserted in the end of the outer sheath 40, as seen in FIG. 6B. The holes are arranged at a small angle relative to each other such that the filler wires 14a and 14b converge toward a point beyond the nozzle outlet. The converging spacer element 44' of FIG. 6B could be substituted for the straight spacer element 44 in the embodiment of FIG. 6D.

Lastly, FIG. 6C shows a nozzle having an adjustable contact element 38' and a non-adjustable curved end. In this embodiment, a curved ceramic spacer element 46 having a pair of parallel curved channels for filler wires 14a and 14b is mounted inside the end of the outer sheath 40. Alternatively, the holes in element 46 may converge near the outlet.

In accordance with the present invention, the overall thermal efficiency of heating the workpiece by preheating of the wire can be made higher than the efficiency of workpiece heating with the arc. The higher efficiency of the wire resistance heating is due in part to the lower losses from convection and radiation to the surrounding environment, relative to these losses from the arc. Additional arc heat is lost by thermal conduction in the electrode. The remaining arc heat is primarily transferred directly to the workpiece rather than to the wire (and subsequently to the workpiece), since the projected area of the diverging arc onto the work is several times greater than the projected area onto the relatively thin wire.

Depending on the filler size, feed rate and composition, the total current may be programmed to increase by a selected amount above the prior rate after the feed period begins. This type of change permits the deposition rate to be maximized, rather than have the heat input held constant or minimized. In either case, the total current equals the arc current before the wire contacts the work, which is equivalent to the arc current plus the wire current thereafter, until the wire electrical contact is terminated. The ratio of the arc current to the wire current can be adjusted primarily by the choice of wire size and/or feed rate.

In accordance with further variations of the embodiments depicted in FIGS. 6A–6D, the contact tube 38 (or 38') or the outer sheath 40 can be designed as an additional resistive heating element if made from a high temperature-resistant material having an effective electrical resistance (to the filler wire current) sufficient to be internally heated and to thermally conduct this heat to the extended portion of the wire. In this alternative configuration, part of the heat generated by and dissipated from the nozzle is utilized to preheat the wire by thermal conduction before the wire is heated according to its electrical resistance between the contact tube and the workpiece.

If the total current has been programmed to pulse between predetermined levels, then when the filler wire is in contact with the workpiece and fed at a predetermined rate, the arc current and wire current values may also pulse in synchronism. For the prior art mechanized welding systems having the capability for synchronized pulsing of the wire feed speed with the total current, the preferred method of the present invention utilizes the high-current pulses synchronized with the high-wire-feed pulses, and conversely for the low feed and current pulses. In this proportional feed mode, the wire fed at the higher feed speed is given more current to generate resistance heat at a faster rate. The heat generated by the portion of high level current going through the arc then synchronously melts and superheats the resistance preheated wire, also at a faster rate.

During the low total power period, the wire feed speed is reduced, and its heating rate is simultaneously reduced, according to the new distribution of total current at the lower level between the arc and the wire. Although pulsed current, pulsed voltage and pulsed wire feed types of welding systems are designed to vary between only two predetermined values, this concept may be expanded in a similar manner for pulsing these parameters between more than two levels.

For the preferred embodiment shown in FIG. 2, a constant-current power supply is used, in which case the arc will remain acceptably stable and functional during and after the momentary transition from when the wire first contacts the workpiece. The transition period progresses until the filler wire has reached its steady-state temperature distribution and corresponding electrical resistance distribution along its heated length. If the wire feed speed is inadvertently reduced, for example, because of insufficient current, insufficient melting, and corresponding impingement (dragging or pushing) of the wire on the solid portion of the workpiece (ahead of or below the molten puddle), then the maximum wire temperature will increase. This occurs due to both the longer heating time in the electrical extension length and the increasing resistance of the wire at higher temperature, and the increased resistance heating effect which will tend to be self-limiting. As the wire resistance increases, the wire current decreases, causing the arc current to increase, which also leads indirectly to improved wire melting from the arc's heat, i.e., the power distribution shifts more toward a "cold wire" stable condition.

Alternatively, if the wire feed speed is inadvertently increased, for example, the temperature of the go wire decreases due to the shorter heating time in the electrical extension range, the resistance of the wire decreases, the wire current increases, and the decreased resistance heating effect will tend to be self-limiting. As the wire resistance decreases and the wire current increases, the corresponding arc current and arc heating of the wire decreases, i.e., the power distribution shifts toward more of a "hot-wire" stable condition.

The stability of the arc root position on the work surface is a function of the proximity of the filler wire to the electrode tip and the arc emitting therefrom, relative to the proximity of the electrode tip to the work. This relationship is shown in FIGS. 4 and 5. As the distance between the electrode tip and the wire becomes equal to or less than the distance from the electrode tip to the workpiece, then the arc path from the electrode tip to the wire may become favorable to that from the electrode tip to the workpiece, causing the arc to form a significant root on the wire. This condition can be successfully avoided if the filler entry angle is low enough, and if the filler entry point is sufficiently displaced from the electrode tip.

With a constant-current power supply and with the electrode and filler nozzle connected to the power supply without an additional resistive element, the arc current decreases by the same amount as the current drawn directly by the filler. In accordance with a further preferred embodiment, the filler wire is connected to the power supply by means of a fixed resistive element, such as a low-conductivity spacer between the electrode and the nozzle, or a low-conductivity nozzle material. In accordance with an alternative embodiment, the filler wire is connected to the power supply by means of a variable resistive element. Alternatively, the additional resistive element may be connected to the non-consumable electrode. These variations allow the current distribution between the arc and the hot wire to be moderated according to the needs of the weld, relative to the desired heat input from each element and the controlling electrical conditions, including the resistances of the arc and the wire.

Automatic voltage control (AVC) servo systems for the purpose of maintaining a constant arc voltage by variation of the arc length are common mechanized welding system features. When both the arc and filler material are provided current by the same power supply, it can be advantageous to utilize an AVC servo system to maintain a constant total voltage (in addition to the constant total current).

It is known that for many joining applications using TIG welding arcs, the arc voltage and current characteristically increase or decrease together above a relatively low current value. Therefore with the single-power supply circuit, as the wire contacts the work and the prior arc current decreases and is then shared with the wire, the arc voltage decreases also without an AVC type of response. As a result, the total power will also decrease, which may be highly desirable in those cases where the maximum heat input requires control. In other cases where a constant heat input control is required, an AVC control system combined with a single, constant-current TIG power supply may be used and constant power achieved. In conventional (separate power supply) hot-wire addition, the power generated in the resistance-heated wire adds to the arc power to yield an increased total power with a value greater than that produced by the parallel-circuit arc with hot wire and AVC (which can automatically maintain constant total power). For example, when switches 22 and 34 in FIG. 2 are closed, the circuit maintains constant total power independent of whether the filler material is fed or not, whether the filler is cold wire or hot wire, and its feed rate, if it is fed at any point of the sequence.

In this variation, the total arc current (the sum of the arc and wire currents) is held constant by the "constant-current" design of the power supply, and the total voltage is held constant by the adjustment of the arc length (and therefore arc resistance) with an AVC servo system. With the hot-wire nozzle 4 electrically connected to the electrode 2, and when using a constant-current type of power supply with the AVC system enabled (see FIG. 2), the wire voltage is essentially fixed (except for transients at the beginning and end of the feed period). The arc voltage changes according to the AVC system adjustment, with the net result that the total voltage is held constant at the predetermined (programmed) value. Since the total current and total voltage are maintained constant, the electric total power input into the arc and heated wire is essentially constant, regardless of the filler feed rate.

In accordance with a further preferred embodiment, an automatic (system controlled) total-current adjustment allows the arc current to remain constant and independent of both the filler feeding condition and corresponding wire current. In this embodiment, the system is able to adjust to this wire resistance (and therefore total resistance) change automatically, such as by detecting an open circuit between the filler wire and the workpiece, and resetting the total current value to the predetermined value desired for the "filler off" period. The status of the wire current can be determined by a current-sensing device on the branch of the circuit leading to the wire nozzle. In this case, the nozzle is mounted by a means which provides electrical isolation from the electrode so that the wire current will flow through the branch connection containing the wire current sensor. Alternatively, the current sensor is placed in the branch to the electrode to monitor the arc current, and the wire current is electronically determined by subtraction of the arc current from the total current.

In accordance with a further preferred embodiment (without an added resistive element in the electrode or nozzle circuit), the electrode and hot-wire nozzle are mechanically and electrically integrated as a single component. In contrast, the prior art utilizes two separate components for the electrode and the nozzle which are mechanically connected by one or more intermediate members. These members are typically the welding torch (also called the torch block), which holds the electrode shank at an angle approximately perpendicular to the work surface, and a bracket for the filler nozzle, which is held at an acute angle relative to the work surface.

The preferred design of the mechanically integrated electrode and nozzle has a curvature in the plane of the joint to be filled, at least at the distal end of the nozzle. The purpose of the curvature is to ensure positive electrical contact between the nozzle and the wire near the exit end of the nozzle by having more curvature locally than the wire. (The hot-wire heating begins beyond the last point on the wire to make low-resistance electrical contact with the nozzle.) Another purpose is to maintain a consistent azimuthal relationship between the nozzle and the typically curved wire exiting the nozzle, with the curvature of the wire which extends beyond the nozzle lying essentially in a plane parallel to the joint.

A second preferred shape of the mechanically integrated electrode and nozzle is with the full length of the nozzle made to an essentially constant radius in order to achieve the electrical-contact and wire-aim benefits of the curved-end shape. Additional benefits are to facilitate fabrication of the integrated assembly, to maintain the same nozzle end shape after repeated sharpening (and corresponding shortening) of the electrode, and to reduce the friction between the typically curved wire and the curved nozzle. The distal end may have a different radius of curvature than the remainder of the length so as to improve the local electrical contact.

One of the advantages of the new design is to improve alignment of the filler nozzle outlet end (from which the wire emanates) and the electrode tip (from which the arc emanates). The preferred aim position of the wire is centered on a line extending from the electrode tip and parallel to the electrode axis, and entering the molten pool at or near where the axis of the arc intersects the pool.

Another advantage of the mechanically integrated design is to use the arc-generated heat conducted from the electrode tip through the electrode shank as a means of preheating the filler by thermal conduction, in addition to resistance heating due to the current in the wire beyond the nozzle. The preferred design for the physical support of the thermally integrated electrode and nozzle is without water cooling, in order to maximize the temperature and therefore the conductive heating effect from the electrode and nozzle to the wire.

Figure 7A:
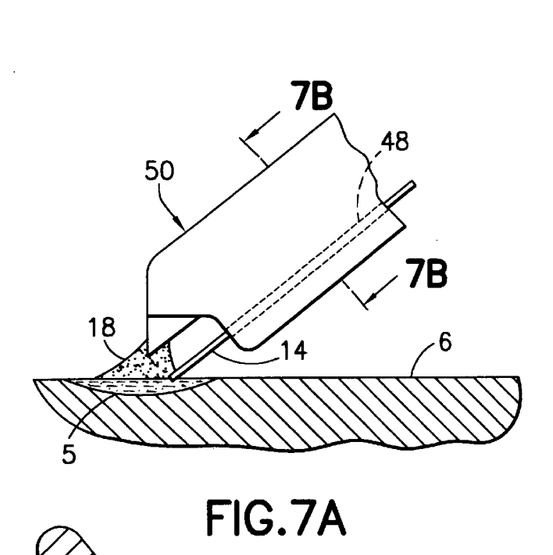
FIGS. 7A and 8A are schematics showing mechanically and electrically integrated non-consumable electrode/hot wire filler nozzle assemblies in accordance with additional preferred embodiments of the invention.
Figure 7B:
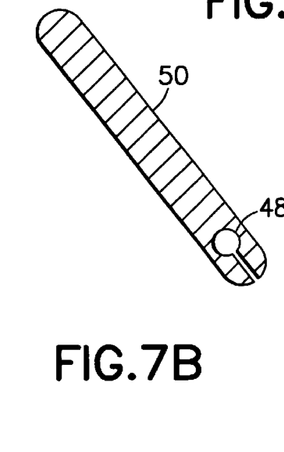
FIGS. 7B and 8B are schematics showing sectional views of the embodiments depicted in FIGS. 7A and 8A respectively, the sections being taken along lines 7B—7B in FIG. 7A and lines 8B—8B in FIG. 8A.
Figure 8A:
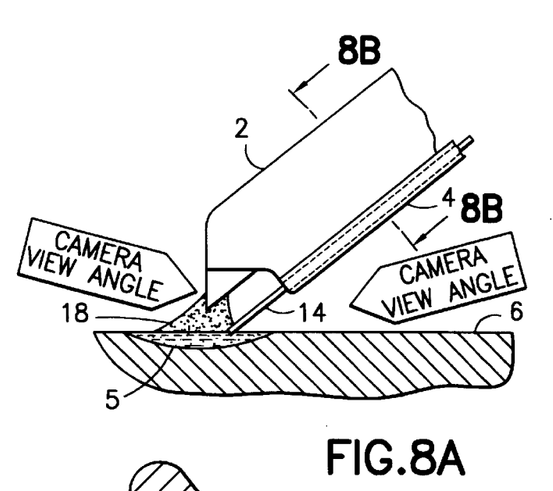
Figure 8B:
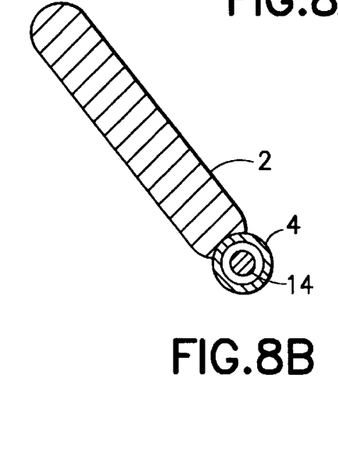

The mechanically integrated electrode and nozzle may be fabricated from a monolithic piece 50 of tungsten alloy (as seen in FIGS. 7A and 7B), or may be formed from individual pieces such as a portion of sheet stock or blade-shaped electrode 2 joined to a tubular-shaped nozzle 4 (as seen in FIGS. 8A and 8B). In the latter case, the individual pieces may be joined by laser beam welding, electron beam welding or other means providing electrical continuity and mechanical integrity. This design allows use with either a single filler wire or multiple filler wires fed simultaneously, in order to improve the deposition rate or to control the deposit properties, especially those governed by heat input.

Figure 7C:
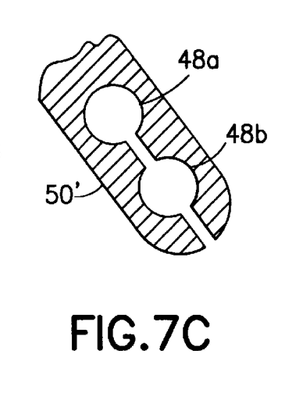
FIG. 7C is a schematic showing a sectional view of a variation of the preferred embodiment of FIG. 7A having two filler wire channels.

Two general shapes may be used for the integrated electrode and nozzle—with either a straight or curved hole for the filler. In the case of the monolithic electrode/nozzle, the holes may be cut by electro-discharge machining (EDM) or other suitable means to form a "key-hole" shaped passage (48 in FIG. 7B) for the wire along the edge of the monolithic piece. FIG. 7C shows a passage formed by EDM having two channels 48a and 48b for respective filler wires. For the curved nozzle design, the hole may be formed by attachment of a curved tube to the similarly curved edge of the electrode.

Figure 9:
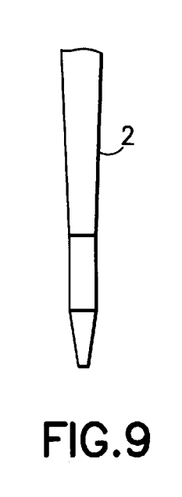
FIG. 9 is a schematic showing a side view of a tapered electrode having a truncated pyramid tip.

In accordance with a further aspect of the invention, a tapered electrode 2 having a truncated pyramidal tip, as shown in FIG. 9, may be used. Furthermore, as indicated in FIG. 8A, during welding, the arc 18, weld puddle 5 and filler wire 14 are observed using a remote viewing camera (not shown). The mechanically integrated electrode and nozzle should be designed so that the camera's view of the weld puddle 5 from either side is not obstructed.

In both embodiments shown in FIGS. 7A and 8A, the electrode tip has a triangular profile and is asymmetric relative to the axis of the integrated electrode/nozzle In accordance with a preferred embodiment of the invention, no additional resistance is used in either the electrode branch or the filler wire branch of the circuit, and the electrode and filler wire are directly connected in a parallel resistive circuit. In order for sufficient time to pass so that the wire can come to near equilibrium temperature after making contact with the workpiece (for a predetermined feed rate), a wire speed upslope or "soft-start" to the filler feed rate is preferred. For a programmable welding system, this may be accomplished by programming one or more additional levels with intermediate feed rates beginning after the wire feed "on" command is initiated. An improved design is to utilize a current sensing device on one of the branches (arc or wire side) of the parallel circuit, which automatically begins the preselected wire upslope rate at the beginning of wire contact without further programming. In a variation of the automatic soft-start, the total current can be controlled if desired so that the arc current is decreased at a slower rate than that at which the wire current is increased, in turn allowing the filler to substantially preheat before the arc current and corresponding molten pool size are decreased.

In accordance with a further aspect of the invention, an electric arc is established and maintained between the end of the filler wire and the workpiece, simultaneously with a second electric arc between the end of the non-consumable electrode and the workpiece. This hybrid combination of processes is similar to TIG and MIG welding, except that the two arcs are electrically connected in parallel to a single power source (or to dual power supplies with an integrated and controlled total power output), and may be either adjacent to each other or physically separated along the joint. Since the non-consumable (TIG) and consumable (MIG) electrodes may be physically separated along the joint, the TIG arc may be used without filler material addition for heat-treating purposes such as preheating of the substrate or post-heating of the deposit. The preferred configuration of the welding system is with AVC circuits to maintain stable resistances of the arcs, enabling them to share the same current source, yet preventing one arc from excessively dominating the other.

Figure 10:
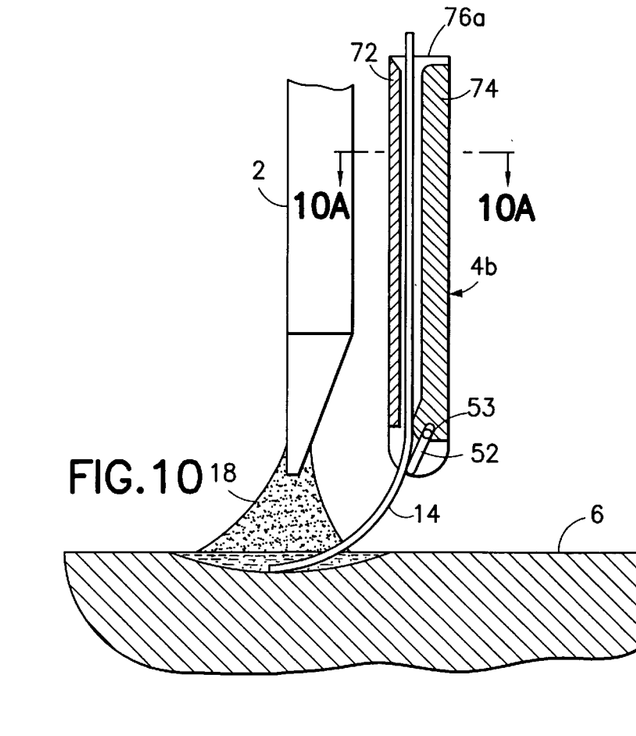
FIGS. 10 and 11 are schematics showing side views (with one nozzle sidewall removed) of integrated vertical electrode and wire nozzle assemblies with adjustable low-entry-angle wire deflection devices in accordance with two further preferred embodiments of the invention.
Figure 10A:
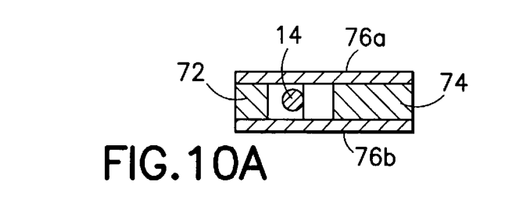
FIGS. 10A and 11A are schematics showing sectional views of the embodiments depicted in FIGS. 10 and 11 respectively, the sections being taken along lines 10A—10A in FIG. 10 and lines 11A—11A in FIG. 11.

In accordance with another preferred embodiment shown in FIGS. 10 and 10A, a vertical filler nozzle 4b has a low-entry-angle bending tip. For very deep joints or joints with significant lateral curvature (relative to the direction of travel), the combination of a short, vertical nozzle which maintains a low filler entry angle (relative to the surface of the weld pass facing the torch) may be desirable. When the filler wire is preheated, it bends with less force than when cold. Thus, for a vertical wire feed configuration as shown in FIG. 10, the filler feeding process requires less axial force and becomes more practical. The plastic (permanent) bend in the filler after it exits the nozzle can be generated near the outlet end of the nozzle by means of a path for the filler which deviates from the body of the nozzle. This deviated path is generated by either fixed or adjustable guide contact points, allowing the bend radius to be predetermined or adjusted during the joining process. As seen in FIG. 10, the contact point can consist of a hardened (low-friction) sliding element 52 having an angular position which is adjustable, i.e., by pivoting the slide 52 about a pivot 53 and then locking the slide in position using a conventional means such as a set screw. The bending slide 52 deflects the filler wire 14 into the weld puddle 5. The bending slide 52 may be wear-resistant steel for cold-wire feed, insulating ceramic for either cold or hot-wire feed, or hard, conducting copper alloy for hot-wire feed. As seen in FIG. 10A, the nozzle is constructed by sandwiching two bar-shaped members 72 and 74 between a pair of parallel opposing sidewalls 76a and 76b made of sheet material. Member 74 has a shoulder 74a designed to bear against the filler wire 14.

Figure 11:
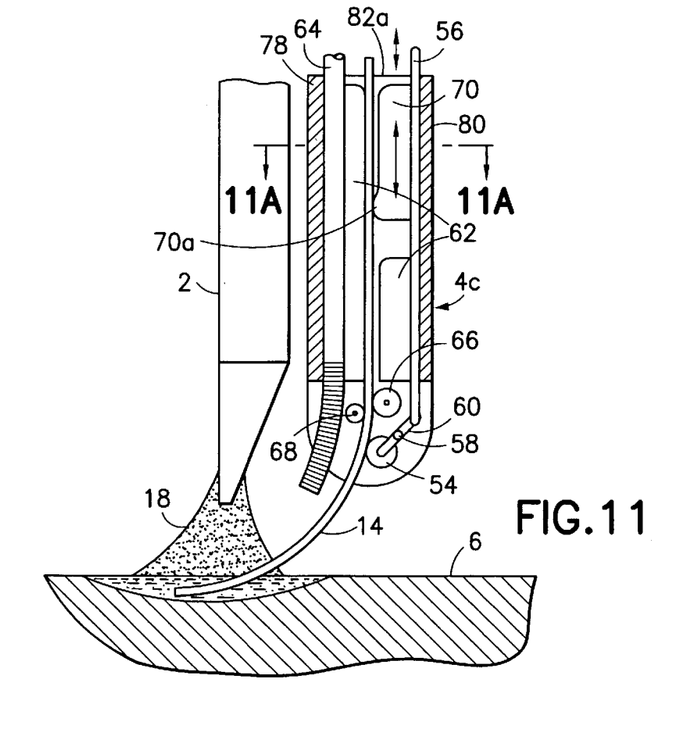
Figure 11A:
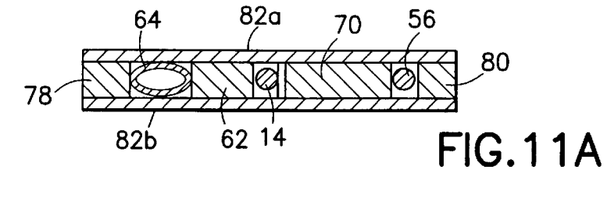

An alternative vertical filler nozzle 4c having a low-entry-angle bending tip is shown in FIGS. 11 and 11A. The contact point can consist of a hardened rolling element 54 rotatably mounted on one end of an arm 60 having an angular position which is adjustable, i.e., by pivoting the arm 60 about a pivot 58. The other end of arm 60 is rotatably coupled to an end of a drive rod 56 which is vertically slidable in a guiding channel formed in the nozzle 4c. The filler wire 14 is threaded between a pair of wire guide rollers 66 and 68 and is then deflected toward the weld puddle 5 by rolling element 54. As seen in FIG. 11A, the nozzle is constructed by sandwiching two bar-shaped members 78 and 80 between a pair of parallel opposing sidewalls 82a and 82b made of sheet material. Two electrically insulating members 62a and 62b are sandwiched between sidewalls 82a and 82b. Members 62a and 78 have a gap therebetween in which a gas distribution tube 64 resides. The gas distribution tube 64 terminates in a coiled spring 84 having a closed end made of porous material. A laminar flow of gas escapes between the turns of the coiled spring. Members 62b and 80 have a gap therebetween in which the drive rod 56 is slidably installed.

For hot-wire feed, a vertically slidable conductor 70 is arranged with a rounded shoulder 70a in contact with the filler wire 14. The position of conductor 70 is adjusted as needed to change the electrical extension, i.e., to vary the heated length of the wire, and therefore the temperature to which it is heated before it enters the weld pool.

The foregoing preferred embodiments of the invention have been disclosed for the purpose of illustration. Variations and modifications of the disclosed structure will be readily apparent to practitioners skilled in the art of welding. All such variations and modifications which do not depart from the concept of the invention are intended to be encompassed by the claims set forth hereinafter.

What is claimed is:

1. An apparatus comprising:

first and second components to be welded, said first and second components forming a groove having a bottom;

a welding electrode having an electrode tip at an end thereof, said electrode tip being located in said groove; and a filler material guide nozzle for guiding filler material to a location in the path of an arc from said electrode tip, said filler material guide nozzle having an outlet for the filler material at a distal end thereof, said outlet being located in said groove, wherein said electrode and said guide nozzle are mutually parallel and inclined at an angle substantially less than 90° relative to a plane tangent to a surface of said groove bottom lying directly beneath said electrode tip, and said electrode tip is asymmetric relative to an axis of said electrode.

2. The apparatus as defined in claim 1, further comprising a power supply electrically connected to said guide nozzle, said guide nozzle comprising at least a portion made of electrically conductive material.

3. The apparatus as defined in claim 2, further comprising a switch which can be opened to selectively disconnect said guide nozzle from said power supply.

4. The apparatus as defined in claim 1, further comprising a spacer arranged between and connected to said electrode and to said guide nozzle.

5. The apparatus as defined in claim 4, wherein said spacer is made of resistive heating material.

6. The apparatus as defined in claim 4, wherein said spacer is made of electrically insulating material.

7. The apparatus as defined in claim 4, wherein said spacer is made of thermally conductive material.

8. An apparatus comprising:

first and second components to be welded, said first and second components forming a groove having a bottom;

a welding electrode having an electrode tip at an end thereof, said electrode tip being located in said groove; and a filler material guide nozzle for guiding filler material to a location in the path of an arc from said electrode tip, said filler material guide nozzle having an outlet for the filler material at a distal end thereof, said outlet being located in said groove, wherein said electrode and a first portion of said guide nozzle are mutually parallel and generally vertical relative to a plane tangent to a surface of said groove bottom lying directly beneath said electrode tip, said guide nozzle having a second portion which is curved, said second portion having an outlet aimed at said surface of said groove bottom lying directly beneath said electrode tip.

9. The apparatus as defined in claim 8, further comprising a spacer arranged between and connected to said electrode and to said guide nozzle.

10. A hot-wire guide nozzle comprising:

an outer sheath having a first section and an outlet;

a electrically conductive contact element arranged inside said first section of said outer sheath and having a first throughhole for passage of a first filler wire therethrough; and an inner sheath arranged between said outer sheath and said contact tube and made of electrically insulating material, wherein said contact element is slidable relative to said outer sheath.

11. The hot-wire guide nozzle as defined in claim 10, wherein said outer sheath has a second section which is curved, said second section being between said first section and said outlet of said outer sheath, and further comprising a multiplicity of electrically insulating spacers arranged end to end in said second section of said outer sheath, each of said spacers being movable relative to adjacent spacers and having a throughhole for passage of said first filler wire therethrough.

12. The hot-wire guide nozzle as defined in claim 10, wherein said outer sheath has a non-circular cross section, and said contact element has a second throughhole for passage of a second filler wire therethrough.

13. The hot-wire guide nozzle as defined in claim 12, wherein said outer sheath has a second section between said first section and said outlet of said outer sheath, and further comprising an electrically insulating spacer arranged in said second section of said outer sheath, said spacer having first and second throughholes for passage of said first and second filler wires respectively therethrough.

14. The hot-wire guide nozzle as defined in claim 13, wherein said first and second throughholes have respective axes which converge.

15. A welding electrode consisting of a monolithic piece of electrically conductive material, wherein said monolithic piece comprises a flat shank with first and second lateral edges and a tip extending from an end of said shank, said shank having a first open guide channel for passage of a first filler wire therethrough, said first guide channel being arranged closer to said first lateral edge than to said second lateral edge and having an outlet, said outlet being the portion of said guide channel closest to said tip.

16. The welding electrode as defined in claim 15, wherein said electrode tip is asymmetric relative to an axis of said shank.

17. The welding electrode as defined in claim 15, wherein said first open guide channel runs generally parallel to a lateral edge of said shank.

18. The welding electrode as defined in claim 15, wherein said shank further has a second guide channel for passage of a second filler wire therethrough.

19. An apparatus comprising:

a welding electrode comprising a flat shank having a thickness, a distal end, first and second lateral edges separated by a distance greater than said thickness, and a tip connected to said distal end of said shank; and a filler material guide tube attached to said first lateral edge of said shank.

20. A filler wire guide nozzle comprising a guide channel for guiding filler wire therethrough and having an axis and an outlet, a wire deflection device arranged proximal to said outlet of said guide channel, said wire deflection device being arranged to deflect filler wire exiting said outlet in a direction transverse to said guide channel axis, and an adjustment mechanism for changing the position of said wire deflection device to adjust the amount of deflection of said filler wire, said adjustment mechanism comprising a rod which is slidable.

21. The filler wire guide nozzle as defined in claim 20, further comprising a piece made of electrically conductive material which is slidable along said filler wire and has a protuberance which remains in contact with said filler wire during sliding.

22. A filler wire guide nozzle comprising first and second bar-shaped members sandwiched between a pair of parallel opposing sidewalls made of sheet material.

23. The filler wire guide nozzle as defined in claim 22, wherein said first bar-shaped member has a shoulder facing said second bar-shaped member.

24. The filler wire guide nozzle as defined in claim 22, further comprising a wire deflection device and an adjustment mechanism for changing the position of said wire deflection device.

25. The filler wire guide nozzle as defined in claim 24, wherein said adjustment mechanism comprises a rod which contacts and is slidable relative to said first bar-shaped member.

26. The filler wire guide nozzle as defined in claim 22, further comprising first and second electrically insulating members sandwiched between said first and second sidewalls and arranged between said first and second bar-shaped members, said first and second electrically insulating members being arranged in mutual opposition with a first gap therebetween.

27. The filler wire guide nozzle as defined in claim 26, further comprising a piece made of electrically conductive material, said electrically conductive piece being arranged in opposition to said second electrically insulating member with a second gap therebetween and being slidable relative to said second electrically insulating member.

28. The filler wire guide nozzle as defined in claim 26, further comprising a wire deflection device and an adjustment mechanism for changing the position of said wire deflection device, wherein said adjustment mechanism comprises a rod slidably arranged in a second gap between said first bar-shaped member and said first electrically insulating member.

29. The filler wire guide nozzle as defined in claim 26, further comprising a gas distribution channel between said second bar-shaped member and said second electrically insulating member.

* * * * *